March 6, 1951     S. E. COLLINSON     2,544,067
TEMPLE SHAPING TOOL
Filed Nov. 25, 1949
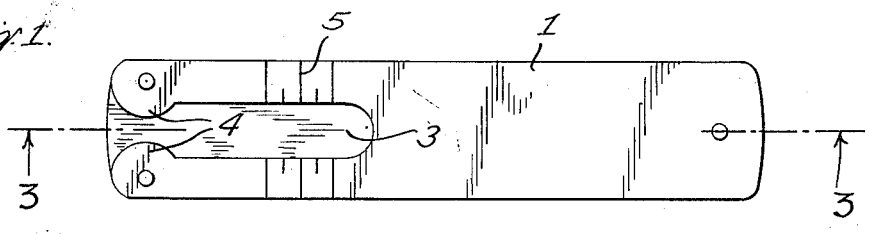
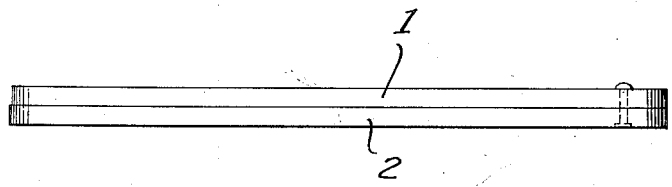
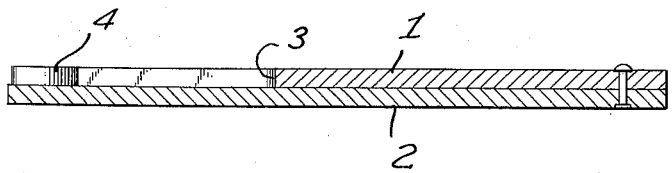
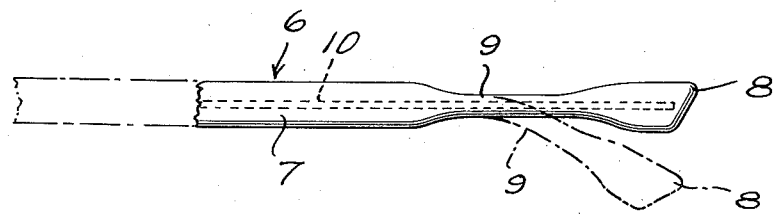
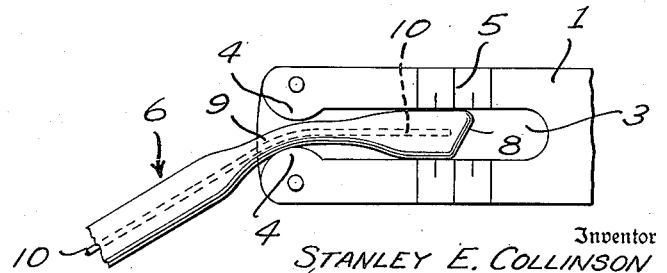
Inventor
STANLEY E. COLLINSON
By Victor N. Borst
Attorney Patented Mar. 6, 1951

2,544,067

UNITED STATES PATENT OFFICE 2,544,067

TEMPLE SHAPING TOOL

Stanley E. Collinson, New York, N. Y., assignor to Newport Optical Mfg. Co., Inc., Brooklyn, N. Y.

Application November 25, 1949, Serial No. 129,314

3 Claims. (Cl. 81—3.5)

This invention relates to a tool or device for facilitating certain bending or shaping operations and particularly it is designed and suited for use by oculists in adjusting the temples of spectacle frames to individual requirements.

Embodiments of the invention are especially useful in connection with the bending of plastic temples to fit over the ears of the wearer, not only affording a convenient instrument to effect the shaping, but also having means to facilitate the determination of the proper place for making the bend.

A type of temple in current use is composed of a relatively wide flat strip of plastic material such as zylonite, which commonly tapers uniformly to increasing width from the hinge end to the rear end, the rear end being adjusted to bear against the head of the wearer behind the ear. The ear-engaging portion is commonly bent down more or less to fit around the ear, and the present invention is adapted to this type of temple in which the ear-engaging portion is reduced in width and consequently is more readily adjusted.

The tool is an elongated member so that one end constitutes a handle portion and it may be flat and straight. In the operating end a recess is formed in one face of the proper configuration to receive the end of a temple and assist the operator in bending it while eliminating the likelihood of damage.

These plastic temples are reinforced by an embedded wire, and if the temple is given too sharp a bend, the wire will be kinked or take a permanent bend and make further adjustment difficult. One of the characteristics of this invention is the provision of means to control the degree of bending. Other objects and features of the invention will appear from the following description of the embodiment illustrated in the accompanying drawings in which Fig. 1 is a plan of a device embodying the invention;

Fig. 2 is a side elevation of the same;

Fig. 3 is a sectional elevation on the line 3—3 of Fig. 1;

Fig. 4 is a fragmentary representation of the end portion of a temple which the illustrated device is especially adapted to shape; and Fig. 5 is a view similar to Fig. 1 of the operating end of the device with the end of the temple inserted and undergoing a bending operation.

The embodiment shown is a straight flat member which may be made of a suitable plastic or other material and in practice is approximately five inches long and an inch wide. The device may obviously be molded in one piece, but in the illustrated construction it is laminated of two strips 1 and 2 which are secured together in any suitable way, as by rivets.

The top layer 1 has a central, axial slot 3 formed in it which is open at one end and extends inward for something less than half the length of the device. This slot, therefore, constitutes a flat bottomed, open ended groove or recess in the face of the device including the strip 1. For the greater portion of its length, the side walls of the recess 3 are parallel, but at the open end the side walls have inward, opposed circular projections 4 which have their centers in a transverse line normal to the axis and have equal radii. They thus form a restricted axial opening for the slot, and provide a rounded surface or form over which the article may be bent. Since these rounded projections are like, the device is reversible.

Scale marks 5 are provided on the parallel side walls of the recess which mark successive distances back of the centers of the projections 4.

A typical article to be shaped by the device is the spectacle temple 6 shown in Fig. 4. This is a so-called wide temple of plastic and has the side portion 7, the terminal head-bearing pad portion 8 and the narrow connecting neck portion 9 which is the ear-bearing portion that is to be shaped, as indicated by the dotted lines in Fig. 4. Initially the temple is straight and tapers rearwardly, being cut from sheet stock. Imbedded in the temple is an axial wire 10.

The width of the recess 3 back of the restricted opening is substantially that of the end portion 8 of the temple, and the space between the rounded projections 4 in the line connecting their centers is substantially the width of the portion 9 of the temple.

In operation, the end of the temple is laid in the groove or recess, the end of the device beyond the recess being grasped as a handle. This condition is illustrated in Fig. 5, and it is apparent that the turning of the device about the point of contact with the portion 9 of the temple will form a bend the radius of which even in a 90° angular movement cannot be less than that of the forming or bearing projection 4. The radius of the projection is such that an extreme bend will not be sharp enough to kink the wire. Ordinarily a radius of approximately $\frac{5}{16}$ of an inch will be the minimum.

It is apparent that the temple may be bent either up or down with equal result since the two rounded projections 4 are similar.

The function of the scale marks 5 is to indicate the place along the length of the temple where the bending will occur. The instructions to the operator will accord with the measurements of the wearer, and the operator can easily follow such instructions by entering the temple more or less into the recess, being guided by the scale marks.

It is obvious that modifications may be made in the precise construction shown in the drawings and above particularly described, within the principle and scope of the invention as defined in the following claims.

I claim:

1. A tool for shaping spectacle temples comprising an elongated member having a recess in one face extending axially from and open at one end of the member, the side walls of the recess having opposed inward rounded projections at the open end and the walls back of said projections being parallel.

2. A tool for shaping spectacle temples comprising an elongated member having a flat bottomed groove forming a recess in one face extending axially from and open at one end of the member, the side walls of the groove having circular projections at the open end similar and opposed to each other and constricting the width of the groove at its open end, the walls back of said projections being parallel.

3. A tool for shaping spectacle temples comprising an elongated member having a flat bottomed groove forming a recess in one face extending axially from and open at one end of the member, the side walls of the groove having circular projections at the open end similar and opposed to each other and constricting the width of the groove at its open end, the walls back of said projections being parallel, and indicating means along said parallel walls at spaced intervals from the transverse line joining the centers of the said projections.

STANLEY E. COLLINSON.

REFERENCES CITED

The following references are of record in the file of this patent:

UNITED STATES PATENTS

| Number | Name | Date |
| --- | --- | --- |
| 216,779 | Brinkerhoff | June 24, 1879 |
| 2,210,360 | Caldwell | Aug. 6, 1940 |
| 2,516,512 | Fitler | July 25, 1950 |